(12) United States Patent
Anson et al.

(10) Patent No.: US 7,762,080 B2
(45) Date of Patent: Jul. 27, 2010

(54) FUEL METERING PUMP CALIBRATION METHOD

(75) Inventors: Bruce Anson, Scottsdale, AZ (US); Mohamad Hanif Y. Vhora, Chandler, AZ (US); Harvey B. Jansen, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 828 days.

(21) Appl. No.: 11/600,658

(22) Filed: Nov. 16, 2006

(65) Prior Publication Data

US 2010/0115959 A1 May 13, 2010

(51) Int. Cl.
*F02C 9/26* (2006.01)

(52) U.S. Cl. ............... 60/772; 60/39.281; 417/44.11

(58) Field of Classification Search .............. 60/39.281, 60/734, 772, 773; 417/44.11; 702/85, 105
See application file for complete search history.

(56) References Cited

U.S. PATENT DOCUMENTS

| | | | |
|---|---|---|---|
| 4,248,194 A | 2/1981 | Drutchas et al. | |
| 4,448,058 A | 5/1984 | Jaffe et al. | |
| 4,841,404 A | 6/1989 | Marshall et al. | |
| 5,076,763 A | 12/1991 | Anastos et al. | |
| 5,372,482 A | 12/1994 | London et al. | |
| 5,447,414 A | 9/1995 | Nordby et al. | |
| 6,805,104 B2 * | 10/2004 | Ricco et al. | 123/495 |
| 6,941,785 B2 | 9/2005 | Haynes et al. | |
| 6,987,373 B2 * | 1/2006 | Kagami et al. | 318/471 |
| 7,217,103 B2 * | 5/2007 | Below | 417/42 |
| 2007/0020108 A1 * | 1/2007 | Walls | 417/44.2 |

\* cited by examiner

*Primary Examiner*—Louis J Casaregola
(74) *Attorney, Agent, or Firm*—Ingrassia Fisher & Lorenz, P.C.

(57) ABSTRACT

A system and method for accurately supplying fuel flow to a gas turbine engine from a fuel metering pump regardless of variations in operating conditions of the fuel metering pump. The system determines an updated flow characteristic curve for an electrically powered positive displacement pump that is configured to supply fluid via a valve that is configured to open at a predetermined fluid inlet pressure. Electrical current is supplied to the pump to thereby cause the pump to supply the fluid to the valve. The electrical current supplied to the pump is monitored to determine when the valve opens, and one or more points on the updated flow characteristic curve are determined based on the determination of when the valve opens.

12 Claims, 4 Drawing Sheets

FUEL METERING PUMP CALIBRATION METHOD

TECHNICAL FIELD

The present invention relates to gas turbine engine fuel metering pumps and, more particularly, to a system and method for calibrating and controlling a fuel metering pump.

BACKGROUND

Many gas turbine engine fuel supply systems include a fuel source, such as a fuel tank, and one or more pumps that draw fuel from the tank and deliver pressurized fuel to the fuel manifolds in the engine combustor via a main supply line. The main supply line may include one or more valves in flow series between the pumps and the fuel manifolds. These valves generally include, for example, a main metering valve and a pressurizing-and-shutoff valve downstream of the main metering valve. In addition to the main supply line, many fuel supply systems also include a bypass flow line connected upstream of the metering valve that bypasses a portion of the fuel flowing in the main supply line back to the inlet of the one or more pumps, via a bypass valve. The position of the bypass valve is typically controlled by a head regulation scheme to maintain a substantially fixed differential pressure across the main metering valve.

The above-described fuel supply system is generally safe, reliable, and robust. Nonetheless, it can suffer certain drawbacks. For example, the metering valve and bypass valve can add to overall system weight and complexity. Moreover, control of the metering valve and bypass valve can result in increased system complexity and cost. Thus, in recent years there has been a desire to implement more electric fuel controls by, for example, controlling the speed of a fuel metering pump. Yet, efforts to implement electric fuel controls have been impeded by the increased cost and complexity of the proposed systems. For example, the need to accurately predict the flow of the fuel metering pump from its speed, regardless of various operating conditions such as, for example, pump performance, fuel viscosity, and output pressure, may rely on relatively complex and costly control schemes.

Hence, there is a need for a system and method of accurately supplying fuel flow to a gas turbine engine regardless of variations in operating conditions, and/or without relying on numerous sensors for sensing the operating conditions, and/or without relying on relatively complex and costly control schemes. The present invention addresses one or more of these needs.

BRIEF SUMMARY

The present invention provides a system and method for accurately supplying fuel flow to a gas turbine engine regardless of variations in operating conditions, and without relying on numerous sensors for sensing the operating conditions, and without relying on relatively complex and costly control schemes.

In one embodiment, and by way of example only, a method of determining an updated flow characteristic curve for an electrically powered positive displacement pump that is configured to supply fluid via a valve that is configured to open at a predetermined fluid inlet pressure, comprises the steps of supplying electrical current to the pump to thereby cause the pump to supply the fluid to the valve. The electrical current supplied to the pump is monitored to determine when the valve opens, and one or more points on the updated flow characteristic curve are determined based on the determination of when the valve opens.

In another exemplary embodiment, a method of establishing fuel flow to a gas turbine engine during engine startup in a fuel supply system that includes an electrically powered positive displacement fuel metering pump in fluid communication with a pressurizing valve that is configured to open at a predetermined inlet pressure includes the steps of determining a nominal flow characteristic curve of the fuel metering pump, and supplying electrical current to the fuel metering pump and controllably increasing its speed to thereby cause the fuel metering pump to supply fuel to the pressurizing valve at an increasing pressure magnitude. The electrical current supplied to the fuel metering pump is monitored to determine when the pressurizing valve opens. A nominal shift value representative of an amount of change from the nominal flow characteristic curve is determined based on the determination of when the pressurizing valve opens. Fuel flow to the gas turbine engine is controlled by applying the nominal shift value to the nominal flow characteristic curve.

In yet a further exemplary embodiment, a system for controlling fuel flow to a gas turbine engine includes an electrically powered positive displacement fuel metering pump, a pressurizing valve, and a control circuit. The fuel metering pump has an inlet that is adapted to receive fuel, and an outlet. The fuel metering pump is further adapted to be supplied with electrical current and is operable, upon being receipt of the electrical current, to supply fuel at a discharge pressure and in accordance with a flow characteristic curve. The pressurizing valve has at least an inlet and an outlet. The pressurizing valve inlet is in fluid communication with the fuel metering pump outlet, and the pressurizing valve is movable between a closed position, in which the valve inlet is not in fluid communication with the valve outlet, and an open position, in which the valve inlet is in fluid communication with the valve outlet. The pressurizing valve is configured to move to the open position when the pump discharge pressure reaches a predetermined pressure. The control circuit is coupled to the fuel metering pump and is configured to monitor the electrical current supplied to the fuel metering pump to determine when the pressurizing valve moves from the closed position to the open position, and to determine one or more points on the flow characteristic curve of the fuel metering pump based on the determination of when the pressurizing valve moves to the open position.

Other independent features and advantages of the preferred system and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
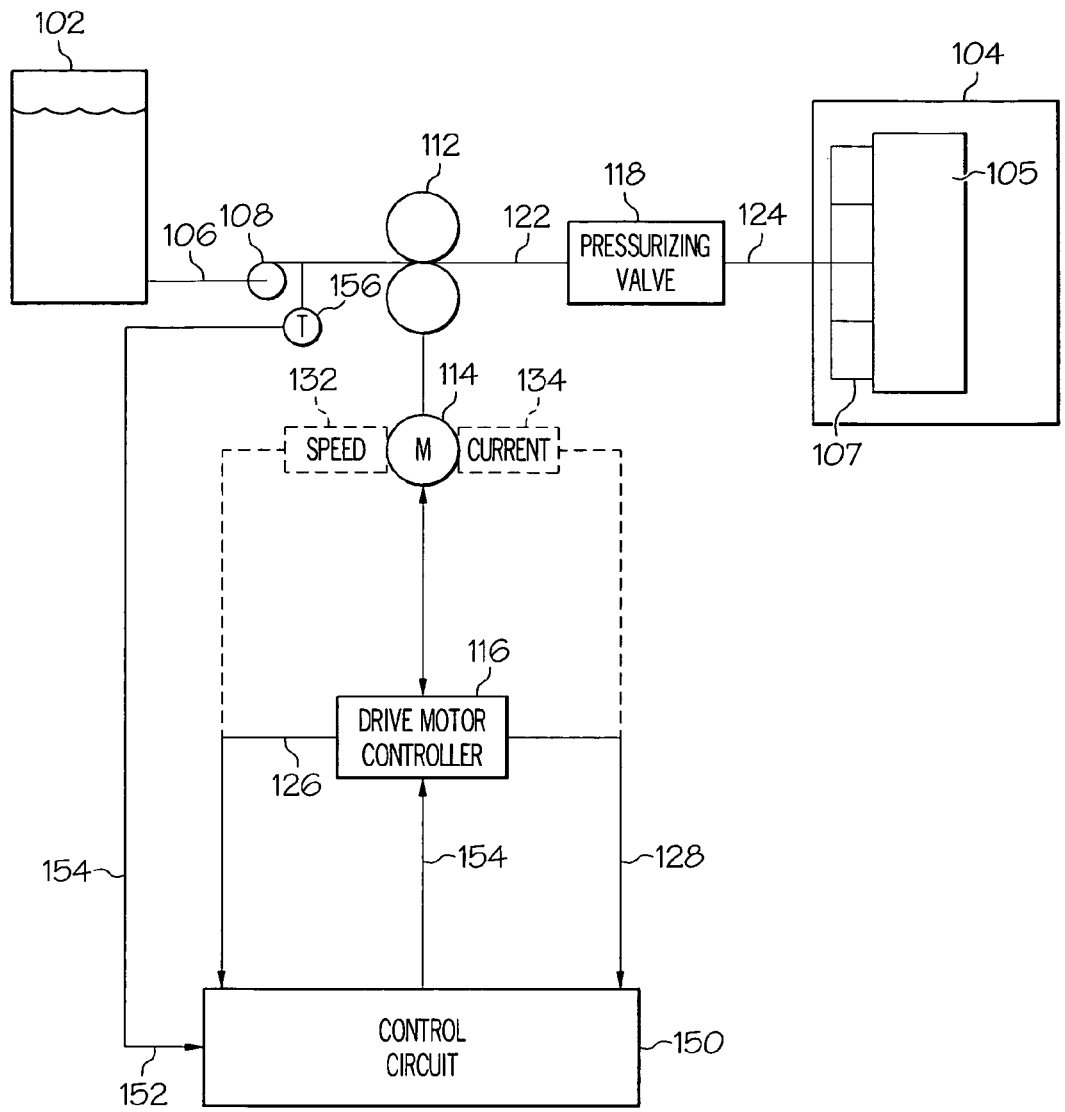
FIG. 1 is a block diagram of fuel delivery and control system for a gas turbine engine according to an exemplary embodiment of the present invention.

A fuel delivery and control system for a gas turbine engine, such as a turbofan jet aircraft engine, according to one exemplary, is depicted in FIG. 1. The system 100 includes a fuel source 102, such as a tank, that stores the fuel supplied to a gas turbine engine 104, and more specifically a combustor 105 in the gas turbine engine 104. A supply line 106 is coupled to the fuel source 102 and, via various components, delivers the fuel to the combustor 105 via a plurality of fuel nozzles 107. It is noted that the supply line 106 is, for convenience, depicted and described with a single reference numeral. However, it will be appreciated that the system 100 may be implemented using separate sections of piping, though a single section is certainly not prohibited.

One or more electrically powered pumps are positioned in flow-series in the supply line 106 and draw fuel from the fuel source 102. In the depicted embodiment, a booster pump 108, such as a relatively low horsepower centrifugal pump, and a high pressure fuel metering pump 112, such as a positive displacement pump, are used. The booster pump 108 draws fuel directly from the fuel source 102 and provides sufficient suction head for the fuel metering pump 112. The booster pump 108 may be either mechanically driven by the engine, or electrically driven by a non-illustrated motor. Moreover, the booster pump 108 may, in some embodiments, not be included.

The fuel metering pump 112 is preferably an electrically powered positive displacement pump, and includes a drive motor 114, and a drive motor controller 116. The drive motor 114 is preferably a brushless DC motor, though it will be appreciated that it could be any one of numerous types of AC or DC motors. No matter the particular type of motor that is used, the motor 114 is configured, upon being energized with electrical current, to rotate and supply a drive force to the fuel metering pump 112. The fuel metering pump 112, as was noted above, is preferably a positive displacement pump, such as a gear pump, and is configured, in response to the drive force supplied from the motor 114, to supply fuel, at a relatively high pump discharge pressure, such as up to 1200 psig, to the remainder of the supply line 106. A more detailed description of the flow characteristics of the fuel metering pump 112 is provided further below.

The drive motor controller 116 controls the supply of electrical power to the drive motor 114, to thereby control the rotational speed of the drive motor 114 and thus the fuel metering pump 112. The drive motor controller 116 is also configured to supply a speed signal 126 representative of the rotational speed of the drive motor 114, and a current signal 128 representative of the magnitude of the current supplied to the drive motor 114. It will be appreciated that in one or more alternative embodiments, and as shown in phantom in FIG. 1, the system 100 could additionally include a speed sensor 132, a current sensor 134, or both. The speed sensor 132, if included, is used to sense fuel metering pump rotational speed and to supply the rotational speed signal 126 representative thereof. The current sensor 134, if included, is used to sense the magnitude of the current supplied to the drive motor 114 and to supply the current signal 128 representative thereof.

A pressurizing valve 118, which is sometimes referred to as a pressurizing-and-shutoff valve, is positioned in flow-series in the supply line 106 downstream of the fuel metering pump 112, and functions to ensure a minimum system pressure magnitude is in the supply line 106 downstream of the fuel metering pump 112. The pressurizing valve 118 includes an inlet 122 that is in fluid communication with the fuel metering pump 112 and an outlet 124 that is in fluid communication with the engine combustor 105, and is movable between a closed position and an open position. In the closed position the pressurizing valve inlet 122 is not in fluid communication with the pressurizing valve outlet 124, and fuel flow through the pressurizing valve 118 and to the combustor 105 is prohibited. Conversely, when the pressurizing valve 118 is in the open position, the pressurizing valve inlet 122 is in fluid communication with the pressurizing valve fluid outlet 122, and fuel flow through the pressurizing valve 118 may occur. The pressurizing valve 118 is configured to move from its closed position to an open position when the fuel metering pump discharge pressure reaches a predetermined pressure, and is further configured to move to the closed position when the fuel metering pump discharge pressure falls below the predetermined pressure.

A control circuit 150, which may be implemented within an engine controller, such as a Full Authority Digital Engine Controller (FADEC) or other electronic engine controller (EEC), controls the flow rate of fuel to the combustor 105. To do so, the control circuit 150 receives various input signals and controls the fuel flow rate to the combustor 105 accordingly. In particular, the control circuit 150 receives a fuel flow command signal 152 from, for example, throttle control equipment (not illustrated) in the cockpit, a fuel temperature signal 154 from, for example, a temperature sensor 156, the rotational speed signal 126, and, at least during the startup sequence of the gas turbine engine 104, the motor current signal 128. The control circuit 150, in response to these signals, determines an appropriate motor speed command, and supplies a speed command 154 to the fuel metering pump drive motor controller 116. In response to the speed command signal 154, the fuel metering pump drive motor controller 116 controls the rotational speed of the drive motor 114, and thus the speed of the fuel metering pump 112, to supply the desired fuel flow rate to the combustor 105. It will be appreciated that in some embodiments, the drive motor controller 116 may be incorporated into the control circuit 150. It will additionally be appreciated that the temperature sensor 156 may be disposed in any one of numerous positions within the system 100, and not just on the inlet of fuel metering pump 112.

Figure 2:
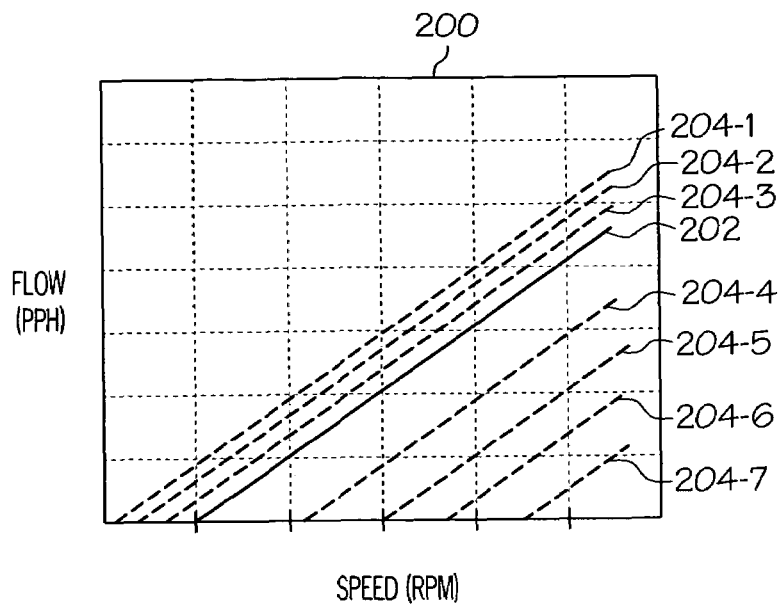
FIG. 2 is a graph depicting a nominal flow versus speed characteristic curve for a positive displacement fuel metering pump that may be used in the system of FIG. 1.

As depicted in FIG. 1 and described above, the fuel delivery and control system 100 does not include any flow sensors. Instead, and as was just noted, fuel flow rate to the combustor 105 is controlled by controlling the speed of the fuel metering pump 112. This can be done, in part, because the fuel metering pump 112 is implemented using a positive displacement pump. As is generally known, positive displacement pumps exhibit generally linear flow versus speed characteristics. For example, FIG. 2 depicts a graph 200 of a nominal flow versus speed characteristic curve 202 for a positive displacement pump. As the graph 200 depicts, the flow rate supplied by a positive displacement pump varies linearly with its speed, for a given set of nominal conditions.

In addition to exhibiting generally linear flow versus speed characteristics, it is also generally known that variations in pump discharge pressure, internal pump leakage due to wear, and fluid viscosity can impact positive displacement pump flow versus speed characteristics. Specifically, and as FIG. 2 also depicts, variations in pump discharge pressure, internal pump leakage, and/or fluid viscosity result in variations in volumetric efficiency, which in turn requires variations in pump speed to supply a given flow rate. More specifically, an increase in discharge pressure, an increase in internal pump leakage, and/or a reduction in fluid viscosity results in decreased volumetric efficiency, and requires a higher pump speed for a given flow rate. Conversely, a decrease in discharge pressure, a decrease in internal pump leakage, and/or an increase in fluid viscosity results in increased volumetric efficiency, and requires a lower pump speed for a given flow rate. However, as is depicted in phantom in FIG. 2, even when the discharge pressure, internal pump leakage, and/or fluid viscosity is varied, the slope of the resultant flow lines 204 (e.g., 204-1, 204-2, 204-3, . . . 204-7) remain at least substantially equivalent to that of the nominal flow line 202.

From the above, it may thus be appreciated that if the amount that the actual flow characteristic of the fuel metering pump 112 has shifted from its nominal flow versus speed characteristic curve 202 is determined, then an updated flow versus speed characteristic curve 204 may be determined. As will now be described, the system 100 is configured such that during each startup sequence of the gas turbine engine 104, the amount that the actual flow characteristic of the fuel metering pump 112 has shifted from its nominal flow versus speed characteristic curve 202 is determined. The amount of shift, which is referred to herein as the nominal shift value, is then used to determine at least an initial updated flow versus speed characteristic curve 204, or at least one point on the updated flow versus speed characteristic curve 204. The control circuit 150 then at least initially controls the speed of the fuel metering pump 112, in accordance with the updated flow versus speed characteristic curve 204 of the fuel metering pump 112, to more accurately supply the commanded fuel flow rate to the gas turbine engine 104. It will be appreciated that after the system 100 begins operating, the temperature of the fuel may vary. Thus, the viscosity of the fuel may also vary after the system 100 begins operating. Because, as was previously noted, fluid viscosity variations affect positive displacement pump flow, the temperature signal 154 that is supplied to the control circuit 150 further increases the accuracy of fuel flow rate supplied by the fuel metering pump 112. This aspect is described in more detail further below.

Figure 3:
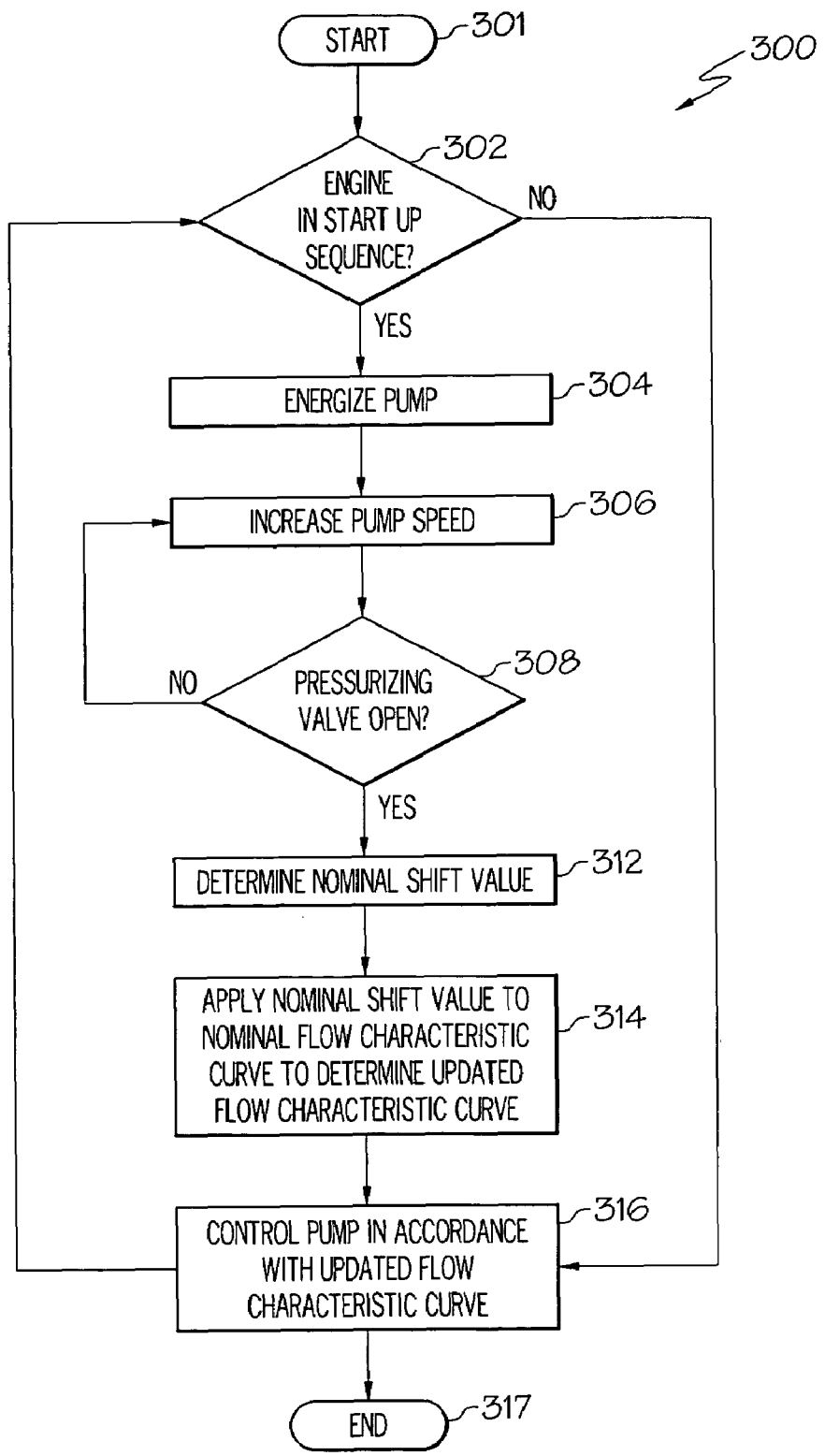
FIG. 3 depicts an exemplary process, in flowchart form, for determining an updated flow characteristic curve for a fuel metering pump that may be used in the system of FIG. 1.

The process 300 by which at least the initial updated or actual flow characteristic curve of the fuel metering pump 112 is determined is depicted in flowchart form in FIG. 3. As will be described, the initial updated flow characteristic curve of the fuel metering pump 112 is determined, in accordance with this process 300, without viscosity, leak, or flow sensors. Before describing the process 300, however, it is noted that the process 300 is preferably implemented via software and/or control logic within the control circuit 150. It is further noted that the parenthetical references in the following description refer to the like numbered flowchart process blocks depicted in FIG. 3.

Turning now to a description of the depicted process 300, it is seen that the process 300 first makes a determination as to whether the engine 104 is implementing a startup sequence (302). This is because the nominal shift value is determined only during an engine startup sequence. Once the engine 104 has completed the startup sequence, and as FIG. 3 also depicts, the fuel metering pump 112 is controlled in accordance with the updated flow characteristic curve (316). If, however, the engine 104 is implementing a startup sequence, the control circuit 150 appropriately energizes the fuel metering pump 112 (304) and increases its rotational speed (306). It will be appreciated that the control circuit 150 may be configured to increase fuel metering pump speed in accordance with any one of numerous profiles. Preferably, however, fuel metering pump speed is steadily ramped up.

No matter that specific manner in which fuel metering pump speed is increased, while its speed is increasing a determination is made as to whether the pressurizing valve 118 has opened (308). If the pressurizing valve 118 has not opened, then the control circuit 150 continues to increase fuel metering pump speed (306). However, when it is determined that the pressurizing valve 118 has opened, the nominal shift value is then determined (312). Before proceeding further, the preferred method of how the determination is made as to when the pressurizing valve 118 has opened, and how the nominal shift value is determined therefrom, will first be described.

As was noted above, the pressurizing valve 118 is configured to move from its closed position to an open position when the fuel metering pump discharge pressure reaches a predetermined pressure. For positive displacement pumps, such as the fuel metering pump 112, the torque generated by the drive motor 114 is proportional to pump discharge pressure. It is also generally known that drive motor current is proportional to generated torque. Hence, fuel metering pump discharge pressure is proportional to drive motor current. It will thus be appreciated that as the fuel metering pump speed increases, causing fuel metering pump discharge pressure to increase, the drive motor current will concomitantly increase. When the pump discharge pressure reaches the predetermined pressure, the pressurizing valve 118 will move to an open position and pump discharge pressure, and thus drive motor current, will stay relatively constant for some speed range beyond that initial opening speed. It is noted that when the pressurizing valve 118 is closed, fuel flow is zero (or all of the flow is due to pump leakage). When the pressurizing valve 118 opens, fuel begins to flow.

Figure 4:
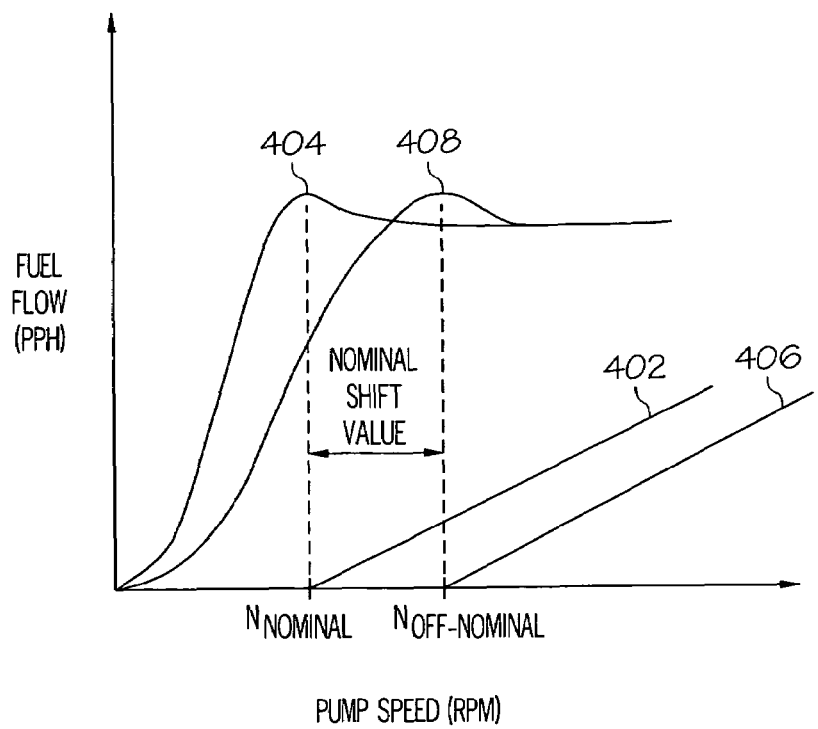
FIG. 4 is a graph that depicts nominal and off-nominal characteristics of an exemplary fuel metering pump that may be used in the system of FIG. 1.

Turning now to FIG. 4, which graphically depicts nominal and off-nominal characteristics of the fuel metering pump 112, the method by which the nominal shift value is determined will be described. The depicted characteristics include a nominal flow versus speed curve 402, a nominal startup current characteristic curve 404, an off-nominal flow versus speed curve 406, and an off-nominal startup current characteristic curve 408. The nominal curves 402, 404 represent the as-built characteristics of the fuel metering pump 112 for a given fuel viscosity, whereas the off-nominal curves 406, 408 represent the fuel metering pump 112 under off-nominal conditions, such as after wear or deterioration, or a change in fuel viscosity. As FIG. 4 depicts, when the fuel metering pump 112 is operating in accordance with its nominal characteristics, the pressurizing valve 118 will open, and fuel will begin to flow, when pump speed reaches $N_{NOMINAL}$ rpm. However, if the fuel metering pump 112 has, for example, deteriorated and is operating in accordance with an off-nominal condition, the pressurizing valve 118 will not open, and thus fuel flow will not begin, until pump seed reaches $N_{OFF-NOMINAL}$ rpm. The difference in the fuel metering pump speeds at which fuel flow begins ($N_{OFF-NOMINAL} - N_{NOMINAL}$) is determined and is the nominal shift value.

Returning once again to FIG. 3, after the nominal shift value has been determined (312), the nominal shift value is applied to the nominal flow characteristic curve to determine the updated flow characteristic curve (314), or at least one point thereon. Thereafter, the fuel metering pump 112 is controlled, at least initially, in accordance with the updated flow characteristic curve (316). In particular, as was noted above, the temperature sensor 156 supplies a fuel temperature signal 154 to the control circuit 150. Because, as was also noted above, fuel viscosity varies with fuel temperature, the control circuit 150 uses the temperature signal 154 to even more accurately control the fuel metering pump 112 after the updated flow characteristic curve is determined. As long as the gas turbine engine 104 remains operating, the control circuit 150 will continue to control the fuel metering pump 112 in accordance with the updated flow characteristic curve (316). When the gas turbine engine 104 is shutdown, the process 300 ceases (317).

It is noted that the process 300, when implemented as described above, only determines a single point on the updated flow characteristic curve. Specifically, the process 300 only determines the point on the updated flow characteristic curve at which flow begins. This point is then used to determine the above-described nominal shift value, which is then applied to the nominal flow characteristic curve to subsequently control the fuel metering pump 112. It will be appreciated, however, that this is merely exemplary of a particular embodiment, and that in other embodiments, because the slope of the updated flow characteristic curve is at least substantially equivalent to that of the nominal flow characteristic curve, additional points on the updated flow characteristic curve could be determined and/or, if desired, the entire updated flow characteristic curve could be generated and used to control the fuel metering pump 112.

Figure 5:
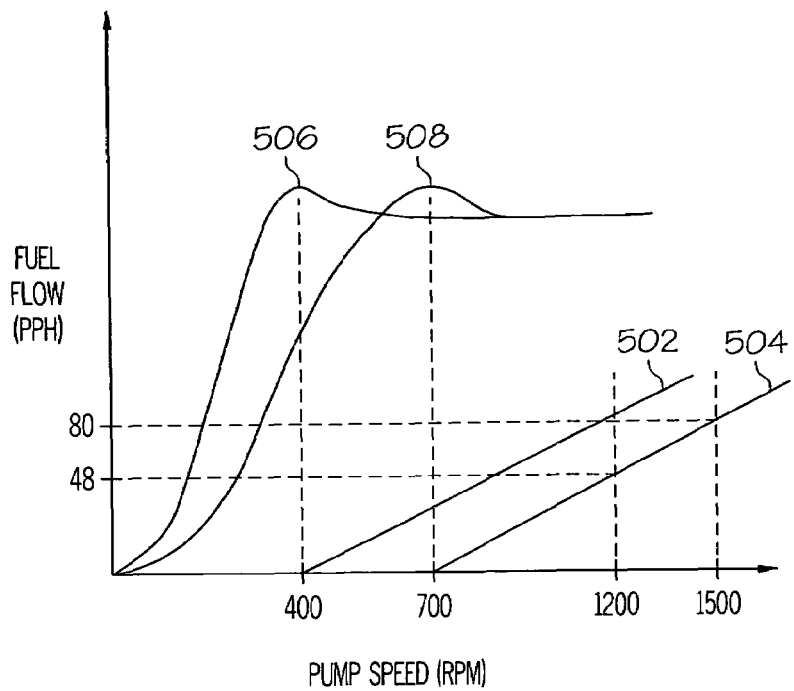
FIG. 5 depicts a graph of a specific example of an application of the exemplary process depicted in FIG. 3 and for the exemplary system of FIG. 1.

For completeness, and with reference now to FIG. 5, a specific example of an application of the above-described methodology to a fuel delivery and control system 100 including a fuel metering pump 112 that has, for example, worn and deteriorated will be described. For this example, it is assumed that a fuel flow rate of 80 pounds per hour (pph) is needed to start the gas turbine engine 104. In accordance with the nominal flow versus speed characteristic curve 502, running the fuel metering pump at 1200 rpm will supply this fuel flow rate. However, because the fuel metering pump 112 has undergone wear and deterioration, the nominal flow versus speed characteristic curve 502 has shifted to the right, and the fuel metering pump 112 now actually operates in accordance with the updated flow versus speed characteristic curve 504.

If the fuel metering pump 112 were initially controlled in accordance with the nominal flow versus speed characteristic curve 502, then during the engine startup sequence the control unit 150 would command the fuel metering pump 112 to run at 1200 rpm. At this speed, the fuel metering pump 112 would supply fuel to the engine 100 at a flow rate of only 48 pph. However, because the system 100 implements the above-described process 300 during the engine startup sequence, the nominal shift value of 300 rpm (e.g., ($N_{OFF-NOMINAL}$=700)–($N_{NOMINAL}$=400)) has been determined, based on the difference in the speeds of the fuel metering pump 112 when the pressurizing valve 118 opens 506, 508 (e.g., the current peaks). Thus, the control circuit 150 commands the fuel metering pump to run at 1500 rpm (e.g., 1200 rpm+300 rpm) instead of 1200 rpm, in order to supply an 80 pph fuel flow rate to the engine 104.

Figure 6:
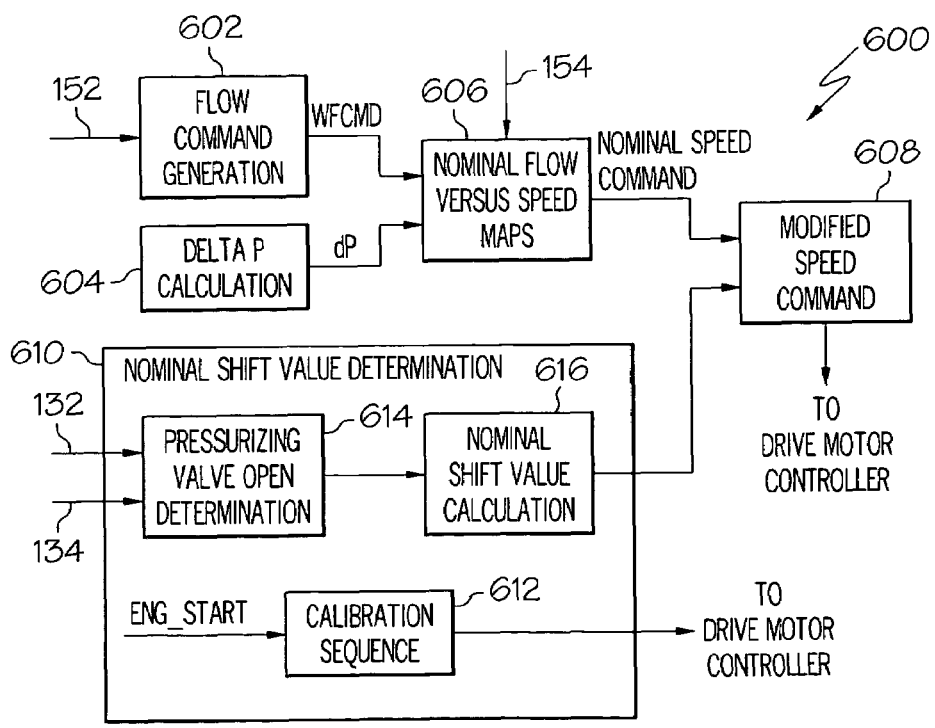
FIG. 6 depicts a functional block diagram of exemplary control logic that may be included in the system of FIG. 1, and used to implement the exemplary process depicted in FIG. 3.

Referring now to FIG. 6, a functional block diagram of an exemplary embodiment of the control logic 600 that may be implemented in the control circuit 150 is depicted and will be described. The control logic 600 includes flow command generation logic 602, delta P calculation logic 604, nominal flow versus speed map logic 606, modified speed command logic 608, and nominal shift value determination logic 610. The flow command generation logic 602 receives the previously mentioned fuel flow command signal 152 from the cockpit and supplies a fuel flow command (WFCMD) representative thereof to the nominal flow versus speed map logic 606.

The delta P logic 604 supplies a calculated pump discharge pressure (dP) to the nominal flow versus speed map logic 606. The pump discharge pressure is calculated from engine combustions system characteristics and current engine operating conditions, using known techniques. This calculation is implemented because during the engine start sequence, pump discharge pressure is generally fixed and is controlled by the opening point of the pressurizing valve 118. Thus, the nominal shift value that is determined during the engine startup sequence only accounts for changes in fuel metering pump wear and/or changes in fuel viscosity. However, as fuel flow increases, fuel metering pump discharge pressure increases. Since the determination of the nominal shift value does not account for this factor, the calculated pump differential (dP) that is supplied to the nominal flow versus speed map logic 606, which will now be described, is used to account for this factor.

The nominal flow versus speed map logic 606 stores data representative of a plurality of nominal flow versus speed characteristic curves. The nominal flow versus speed map logic 606, in response to the calculated dP supplied from the delta P logic 604 and the fuel temperature signal 154 supplied from the temperature sensor 156, selects a particular flow versus speed characteristic curve from the plurality of stored curves. The nominal flow versus speed map logic 606 also functions, in response to the flow command (WFCMD) supplied from the flow command generation logic 602 and using the selected flow versus speed characteristic curve, to supply a nominal speed command to the modified speed command logic 608.

The modified speed command logic 608 receives the nominal speed command from the nominal flow versus speed map logic 606 and the nominal shift value from the nominal shift value determination logic 610. In response, the modified speed command logic 608 applies the nominal shift value to the nominal speed command to determine the appropriate speed at which the pump motor 114 should drive the fuel metering pump 112 in order to supply fuel to the engine at the commanded fuel flow rate. The modified speed command logic 608, upon determining the appropriate speed command, supplies it to the drive motor controller 116, which in turn drives the pump motor 114 to rotate at the commanded speed.

The nominal shift value determination logic 610 implements the above-described process 300 for determining the updated flow characteristic curve of the fuel metering pump 112, and includes calibration sequence logic 612, pressurizing valve open determination logic 614, and nominal shift value calculation logic 616. The nominal shift value determination logic 610 it is preferably active only during the engine startup sequence. Thus, the calibration sequence logic 612 is coupled to receive a signal representative of an engine start command ENG_START. Upon receipt of this signal, the calibration sequence logic 612 supplies speed commands to the drive motor controller 116. As noted above, the speed commands preferably cause the speed of the drive motor 114 to ramp up at a generally constant rate. The speed commands are supplied to the drive motor controller 116 from the calibration sequence logic 612 at least until the pressurizing valve open determination logic 614 determines that the pressurizing valve 118 has moved to an open position.

The pressurizing valve open determination logic 614 receives the motor speed signal 126 and the motor current signal 128 from the drive motor controller 116 (or from the rotational speed sensor 132 and the current sensor 134, respectively). In response, and by implementing the process steps described above, the pressurizing valve open determination logic 614 determines when the pressurizing valve 118 opens and the fuel metering pump speed when it opens. The a value representative of the fuel metering pump speed when the pressurizing valve 118 opens is supplied to the nominal shift value calculation logic 616.

The nominal shift value calculation logic 616 receives the fuel metering pump speed value from the pressurizing valve open determination logic 614, and a nominal fuel pump speed value from the nominal flow versus speed map logic 606. The nominal fuel pump speed value that the nominal flow versus speed map logic 606 supplies to the nominal shift value calculation logic 616 is representative of the speed at which the fuel metering pump 112 would be running when the pressurizing valve moved to an open position, if the fuel metering pump 112 were operating in accordance with its nominal characteristics. The nominal shift value calculation logic 616 takes the difference of the two received values to determine the nominal shift value that it supplies to the modified speed command logic 608. Once the nominal shift value is determined, the nominal shift value determination logic 610 is deactivated until the next engine startup sequence.

As FIG. 6 also depicts, the nominal shift value calculation logic 616 may also include memory 618. If included, the nominal shift value that is determined during the engine startup sequence is preferably stored in the memory 618. The stored nominal shift value may be used in the unlikely event that portions of the nominal shift value determination logic 610 fail, or otherwise become inoperable, or if the nominal shift value determination process 300 is not completed from any other reason. In some embodiments, the stored nominal shift value can also be compared to a newly calculated nominal shift value and, based on the comparison, used to validate or invalidate the newly calculated value.

By implementing the process 300 described herein during an engine startup sequence, more accurate fuel flow to the engine, most notably during a startup, is achieved without incorporating flow, leak, or viscosity sensors. Moreover, the process 300 described herein allows the use of relatively low cost positive displacement pumps. This is because even though many low cost pumps exhibit relatively large variations in flow characteristics with viscosity, the process described herein allows fuel flow accuracy requirements to be maintained over a broader range. The process 300 can also be used to monitor the health status of the fuel metering pump 112 by, for example, logging trends in the nominal shift value during initial startup.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of determining an updated flow characteristic curve for an electrically powered positive displacement pump, the pump configured to supply fluid via a valve that is configured to open at a predetermined fluid inlet pressure, the method comprising the steps of:

supplying electrical current to the pump to thereby cause the pump to supply the fluid to the valve;

monitoring the electrical current supplied to the pump to determine when the valve opens; and determining one or more points on the updated flow characteristic curve based on the determination of when the valve opens.

2. The method of claim 1, further comprising:

determining a nominal flow characteristic curve of the pump;

determining a nominal shift value based on the determination of when the valve opens, the nominal shift value representative of an amount of change from the nominal flow characteristic curve; and applying the nominal shift value to the nominal flow characteristic curve to thereby determine the one or more points on the updated flow characteristic curve.

3. The method of claim 2, further comprising:

storing the nominal shift value in a memory.

4. The method of claim 1, further comprising:

controllably increasing pump rotational speed to thereby controllably increase pump discharge pressure and the electrical current supplied to the pump.

5. The method of claim 4, further comprising:

monitoring pump rotational speed; and determining the pump rotational speed when the valve opens.

6. The method of claim 5, wherein the updated flow characteristic curve is a flow versus speed curve, and wherein the method further comprises:

automatically controlling fluid flow by controlling pump rotational speed.

7. The method of claim 5, further comprising:

determining a nominal flow versus speed curve for the pump; and determining a nominal shift value based on the determination of when the valve opens, the nominal shift value representative of an amount of change from the nominal flow versus speed curve; and applying the nominal shift value to the nominal flow versus speed curve to thereby determine the one or more points on the updated flow characteristic curve.

8. In a fuel supply system that includes an electrically powered positive displacement fuel metering pump in fluid communication with a pressurizing valve that is configured to open at a predetermined inlet pressure, a method of establishing fuel flow to a gas turbine engine during engine startup, comprising the steps of:

determining a nominal flow characteristic curve of the fuel metering pump;

supplying electrical current to the fuel metering pump and controllably increasing its speed to thereby cause the fuel metering pump to supply fuel to the pressurizing valve at an increasing pressure magnitude;

monitoring the electrical current supplied to the fuel metering pump to determine when the pressurizing valve opens;

determining a nominal shift value based on the determination of when the pressurizing valve opens, the nominal shift value representative of an amount of change from the nominal flow characteristic curve; and controlling fuel flow to the gas turbine engine by applying the nominal shift value to the nominal flow characteristic curve.

9. The method of claim 8, further comprising:
monitoring fuel metering pump rotational speed; and
determining the pump rotational speed when the pressurizing valve opens.

10. The method of claim 9, wherein:
the nominal flow characteristic curve is a flow versus speed curve; and
the method further comprises controlling fuel flow to the gas turbine engine by controlling pump rotational speed.

11. The method of claim 8, further comprising:
storing the nominal shift value in a memory.

12. The method of claim 8, further comprising:
storing a plurality of the nominal shift values in the memory; and
determining a health status of the fuel metering pump based at least in part on the stored nominal shift values.

* * * * *